US011392339B2

(12) United States Patent
Kikuchi et al.

(10) Patent No.: US 11,392,339 B2
(45) Date of Patent: Jul. 19, 2022

(54) INFORMATION PROCESSING APPARATUS THAT GENERATES QUALITY REQUIREMENT DATA BASED ON AN ACCEPTABLE DIFFERENCE BETWEEN A STANDARD COLOR VALUE AND COLOR VALUE TO BE OBTAINED

(71) Applicant: CANON KABUSHIKI KAISHA, Tokyo (JP)

(72) Inventors: Shou Kikuchi, Kashiwa (JP); Yuuki Maeda, Nagareyama (JP); Takaaki Yano, Tokyo (JP); Ryo Fujita, Tokyo (JP); Makoto Anno, Tokyo (JP); Hirotomo Tanaka, Kashiwa (JP); Kosuke Tsujita, Abiko (JP); Hiroyuki Toriyabe, Nagareyama (JP); Satoshi Yoshida, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/866,298

(22) Filed: May 4, 2020

(65) Prior Publication Data

US 2020/0358911 A1 Nov. 12, 2020

(30) Foreign Application Priority Data

May 8, 2019 (JP) .............................. JP2019-088595

(51) Int. Cl.
*G06F 3/12* (2006.01)
*H04N 1/00* (2006.01)

(52) U.S. Cl.
CPC .......... *G06F 3/1268* (2013.01); *G06F 3/1203* (2013.01); *G06F 3/1205* (2013.01);
(Continued)

(58) Field of Classification Search
CPC combination set(s) only.
See application file for complete search history.

(56) References Cited

U.S. PATENT DOCUMENTS

| 8,412,066 B2* | 4/2013 | Moroney | ........... G03G 15/5016 399/72 |
| 2005/0206925 A1* | 9/2005 | Agehama | ................. H04N 1/54 358/1.9 |

(Continued)

FOREIGN PATENT DOCUMENTS

JP 2016-115362 A 6/2016

*Primary Examiner* — Barbara D Reinier
(74) *Attorney, Agent, or Firm* — Canon U.S.A., Inc. I.P. Division

(57) ABSTRACT

An information processing apparatus that transmits print data and a print quality requirement to a control system that controls a printing apparatus to output a printed product satisfying required print quality, includes a reception unit configured to receive print data, a display control unit configured to display, on a display unit, a user interface that prompts a user to select a setting of print quality of the print data from among predetermined options, a generation unit configured to generate quality requirement data suitable for an option selected via the user interface, and a transmission unit configured to transmit, to the control system, the print data received by the reception unit and the quality requirement data generated by the generation unit, wherein the quality requirement data includes at least information indicating an acceptable range of a color difference between a standard color value and a colorimetric value of the printed product.

15 Claims, 11 Drawing Sheets

(52) U.S. Cl.
CPC .......... *G06F 3/1208* (2013.01); *G06F 3/1253* (2013.01); *H04N 1/00034* (2013.01); *H04N 1/00244* (2013.01); *H04N 1/00411* (2013.01)

(56) References Cited

U.S. PATENT DOCUMENTS

| | | | |
|---|---|---|---|
| 2010/0046013 A1* | 2/2010 | Bonikowski | G03G 15/5058 358/1.9 |
| 2015/0049921 A1* | 2/2015 | Crean | G06K 9/4652 382/112 |
| 2021/0149609 A1* | 5/2021 | Kikuchi | G06F 3/1208 |
| 2021/0279012 A1* | 9/2021 | Yano | G06F 3/1282 |
| 2021/0279013 A1* | 9/2021 | Anno | G06F 3/1282 |

* cited by examiner

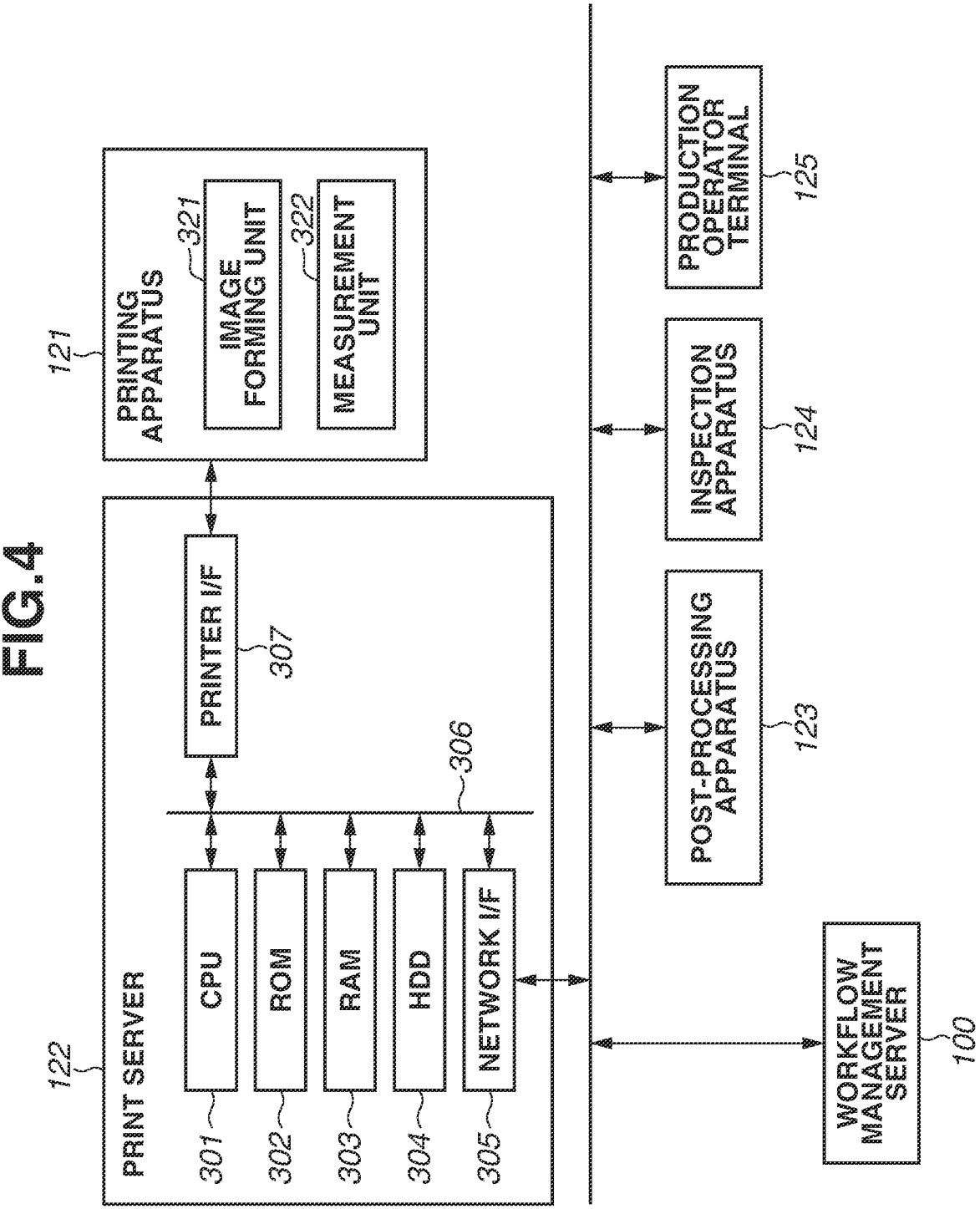

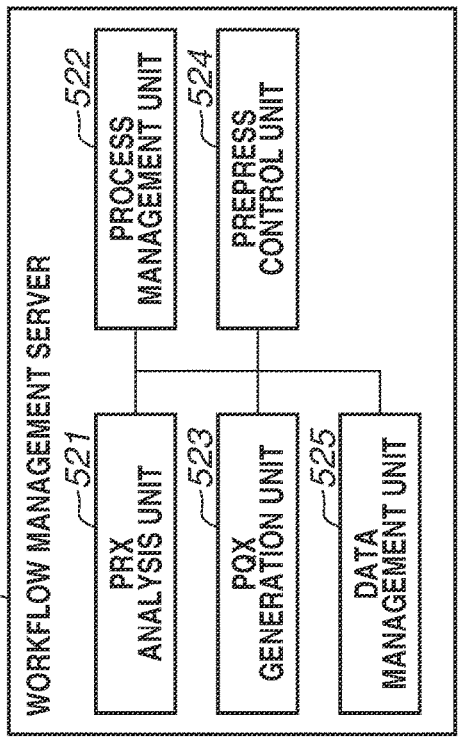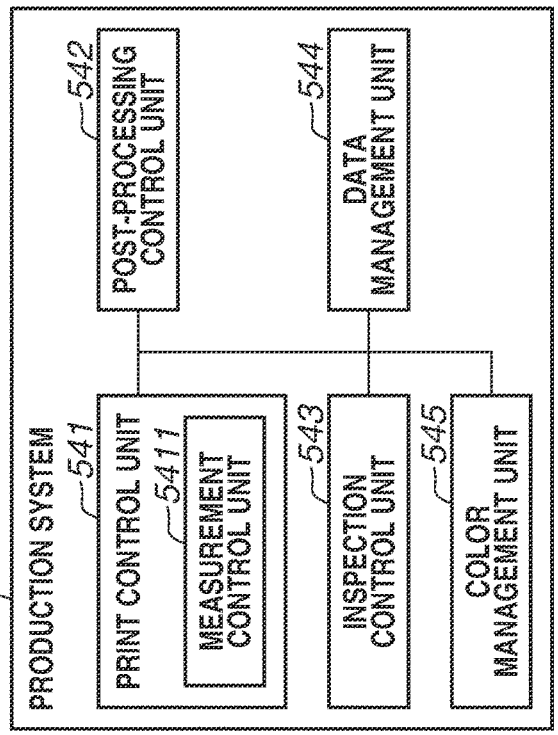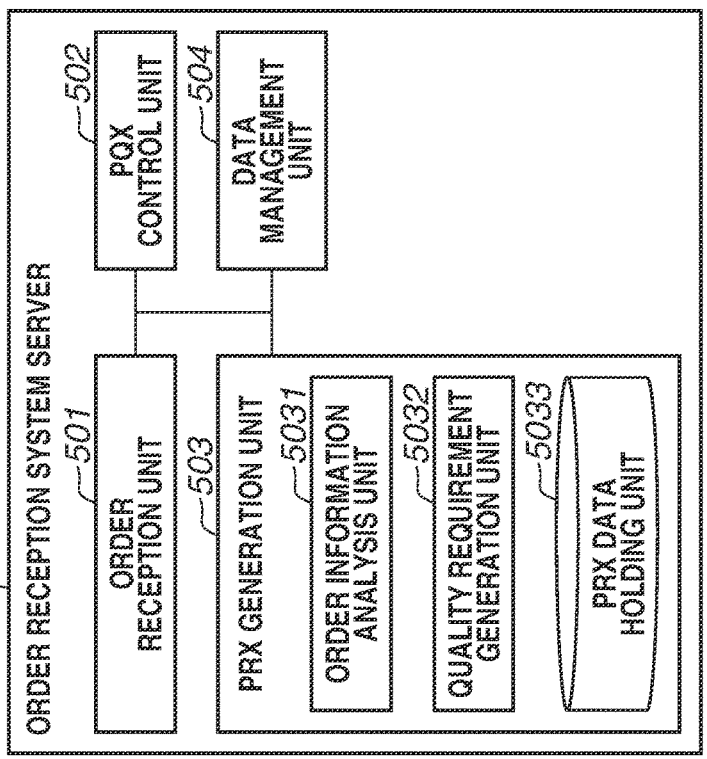

- PrintRequirementsMessage
    - MessageInfo
    - BusinessInfo
    - QualitySpec
        - QualitySpecName/QualitySpecVersion
        - *Specifier
        - CustomerJobType/CustomerItemId
        - BasisOfCalculation
            - WeightedPercentage
            - Formula
        - OverallGradingScale
            - Grade
            - ZeroBaseline
        - MinimumAcceptableRank
        - *DesiredRank
        - QualityParameterSet
            - ParameterSetType/Name/Id
            - *WeightingFactor
            - ParameterSetScoringScale
            - MinimumAcceptableRank/*DesiredRank
            - *RequiredCompliance
            - *RequiredSamplingPositions
    - *CxFReferenceData
    - *SamplingPositionImageData
    - *TagCollection/*CustomResources

FIG.10A

PRX DATA FOR PHOTO BOOK      1001

```
<PRX>
    <QualityParameterSet>
        <QualityParameterSetName> Color Fluctuation Inspection </QualityParameterSetType>
        <QualityParameterSetType> Color </QualityParameterSetType>
        <ParameterSetScoringScale>
            <Score>
                <DisplayLabel> RankColor1 </DisplayLabel>
                <Rank> Rank:1 </Rank>
                <ValueRange> Average ΔE is 4 or More </ValueRange>
            </Score>
            <Score>
                <DisplayLabel> RankColor2 </DisplayLabel>
                <Rank> Rank:2 </Rank>
                <ValueRange> Average ΔE is Less Than 4 and 3 or More </ValueRange>
            </Score>
            <Score>
                <DisplayLabel> RankColor3 </DisplayLabel>
                <Rank> Rank:3 </Rank>
                <ValueRange> Average ΔE is Less Than 3 </ValueRange>
            </Score>
        </ParameterSetScoringScale>
        <MinimumAcceptableRank> Rank:2 </MinimumAcceptableRank>
    </QualityParameterSet>
</PRX>
```

FIG.10B

EDITED PRX DATA      1002

```
<PRX>
    <QualityParameterSet>
        <QualityParameterSetName> Color Fluctuation Inspection </QualityParameterSetType>
        <QualityParameterSetType> Color </QualityParameterSetType>
        <ParameterSetScoringScale>
            <Score>
                <DisplayLabel> RankColor1 </DisplayLabel>
                <Rank> Rank:1 </Rank>
                <ValueRange> Average ΔE is 3 or More </ValueRange>
            </Score>
            <Score>
                <DisplayLabel> RankColor2 </DisplayLabel>
                <Rank> Rank:2 </Rank>
                <ValueRange> Average ΔE is Less Than 3 and 2 or More </ValueRange>
            </Score>
            <Score>
                <DisplayLabel> RankColor3 </DisplayLabel>
                <Rank> Rank:3 </Rank>
                <ValueRange> Average ΔE is Less Than 2 </ValueRange>
            </Score>
        </ParameterSetScoringScale>
        <MinimumAcceptableRank> Rank:2 </MinimumAcceptableRank>
        <DesiredRank> Rank:3 </DesiredRank>
    </QualityParameterSet>
</PRX>
```

FIG.11A

PRX DATA FOR PHOTO BOOK   1101

```
<PRX>
    <BasixOfCalculation>
        TotalRank = Rank(Color Fluctuation Inspection)*0.6 + Rank(Scattering Inspection)*0.3
    </BasixOfCalculation>
</PRX>
```

FIG.11B

EDITED PRX DATA   1102

```
<PRX>
    <BasixOfCalculation>
        TotalRank = Rank(Color Fluctuation Inspection)*0.6 + Rank(Scattering Inspection)*0.1
    </BasixOfCalculation>
</PRX>
```

INFORMATION PROCESSING APPARATUS THAT GENERATES QUALITY REQUIREMENT DATA BASED ON AN ACCEPTABLE DIFFERENCE BETWEEN A STANDARD COLOR VALUE AND COLOR VALUE TO BE OBTAINED

BACKGROUND

Field of the Disclosure

The present disclosure relates to an information processing apparatus, a control method of an information processing apparatus, and a storage medium.

Description of the Related Art

In commercial printing services, a printing firm often receives quality terms for a printed product that have been designated by a customer. The quality terms refer to conditions related to quality of the printed product. Examples of the quality terms include an amount of a positional shift between images on front and back sides of a sheet, and an amount of fluctuation in a color value between images on a plurality of copies or a plurality of pages.

Variety of printed products is wide and includes a material to be distributed such as a flyer and a pamphlet, a photo collection, a book, a name card, and an exhibit panel. Since use applications and prices of such printed products range widely, the quality terms include various requirements and standards.

A printing firm creates a printed product while performing various adjustment work to satisfy these quality terms. For example, based on a sample printing result agreed to by a customer, the printing firm performs various adjustments to obtain a specific color on a specific sheet by a printing apparatus, and removes a printed product determined as not satisfying the quality terms as a defective product in an inspection conducted after printing. The printing firm checks whether the quality of the printed product achieved through such work satisfies the quality terms required by the customer, and submits a quality report to the customer as necessary.

In view of the foregoing, as a method of standardizing information formats for transmitting the quality terms and quality reports, print requirements exchange (PRX) and print quality exchange (PQX) respectively discussed in "ISO/AWI 20616-1, Graphic technology File format for quality control and metadata Part 1: Print requirements exchange (PRX) www.iso.org/standard/68565.html" and "ISO/CD 20616-2, Graphic technology File format for quality control and metadata Part 2: Print quality exchange (PQX) www.iso.org/standard/69572.html" are considered as standardization techniques.

The PRX refers to a standard data format of quality terms required of printing. By using the PRX, it becomes possible to describe the quality terms for different customers or different orders in a uniform standard data format.

The PQX refers to a standard data format of a print quality report. The PQX enables quality data of a printed product to be transmitted in a standard data format. By using the PRX and the PQX in this manner, it becomes possible to transmit the quality terms and quality reports that have not been conventionally standardized in a standardized information format.

Japanese Patent Application Laid-Open No. 2016-115362 discusses a technique of generating a quality requirement for each order for a printed product when the order is received. In a system discussed in Japanese Patent Application Laid-Open No. 2016-115362, required quality is estimated based on a history of past printed products of a customer to determine an image quality target value to be obtained.

Although information formats for transmitting quality terms and quality reports have been proposed, how to apply the information formats to an order reception system that determines print quality as discussed in Japanese Patent Application Laid-Open No. 2016-115362 has not been conventionally considered.

SUMMARY

According to an aspect of the present disclosure, an information processing apparatus that transmits print data and a print quality requirement to a control system that controls a printing apparatus to output a printed product satisfying required print quality, includes a reception unit configured to receive print data, a display control unit configured to display, on a display unit, a user interface that prompts a user to select a setting of print quality of the print data from among predetermined options, a generation unit configured to generate quality requirement data suitable for an option selected via the user interface, and a transmission unit configured to transmit, to the control system, the print data received by the reception unit and the quality requirement data generated by the generation unit, wherein the quality requirement data includes at least information indicating an acceptable range of a color difference between a standard color value and a colorimetric value of the printed product.

Further features of the present disclosure will become apparent from the following description of exemplary embodiments with reference to the attached drawings.

BRIEF DESCRIPTION OF THE DRAWINGS

FIG. 4 is a block diagram illustrating a hardware configuration of a production system according to an exemplary embodiment.

FIGS. 5A, 5B, and 5C are block diagrams illustrating software configurations according to an exemplary embodiment.

FIGS. 7A and 7B are diagrams each illustrating an example of a UI for setting a detailed print quality requirement according to an exemplary embodiment.

FIG. 9 is a diagram schematically illustrating print requirements exchange (PRX) data according to an exemplary embodiment.

FIGS. 10A and 10B are diagrams each illustrating an example of PRX data edited for each quality term according to an exemplary embodiment.

FIGS. 11A and 11B are diagrams each illustrating an example of editing a calculating formula for calculating total quality of a printed product according to an exemplary embodiment.

DESCRIPTION OF THE EMBODIMENTS

Figure 1:
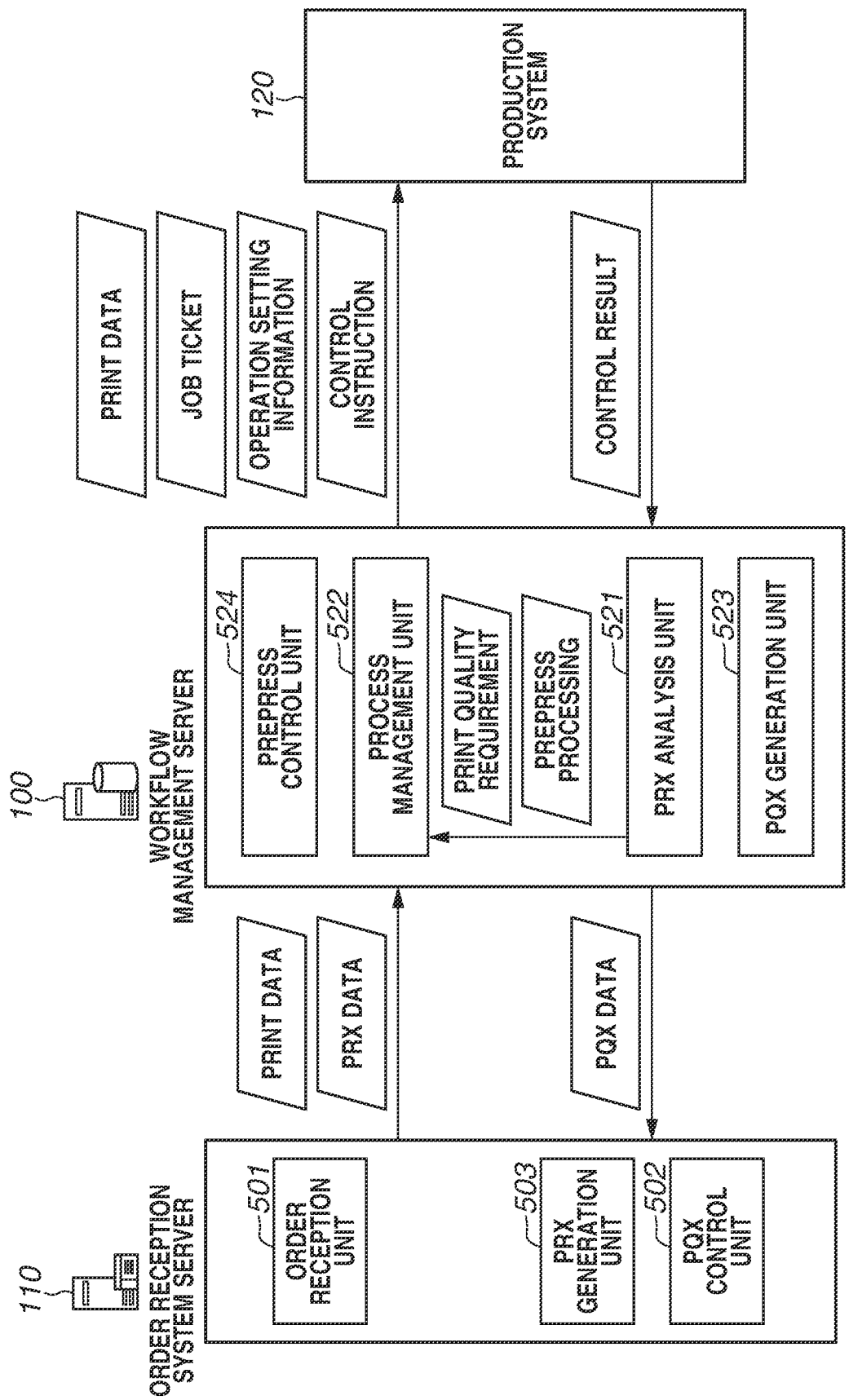
FIG. 1 is a block diagram illustrating an overview of a printing system according to an exemplary embodiment.

An exemplary embodiment of the present disclosure will be described in detail below with reference to the attached drawings. The following exemplary embodiment is not intended to limit the present disclosure set forth in the appended claims, and not all combinations of features described in the exemplary embodiment are always essential to the solving means of the present disclosure.

As for a quality standard of image quality or image displacement between front and back sides, a printing order reception firm or a printing firm usually has a standard setting. Thus, a customer only performs a predetermined print setting, and accordingly, printing is performed in such a manner as to satisfy the quality standard.

On the other hand, quality terms related to reproducibility and stability of color vary depending on customers or printed products, and there can be numerous methods for satisfying the quality terms.

The color reproducibility is an index indicating whether a color defined by Red, Green, Blue (RGB) or Cyan, Magenta, Yellow, Key plate (CMYK) is printed in the same color in a printed product.

The color stability is an index indicating whether print data of the same color is printed in an invariable color in a printed product in the printing of a plurality of pages or a plurality of copies.

A corporate color is a color representing a company or an organization. Thus, a customer usually demands high color reproducibility and stability therefore. More specifically, a customer generally demands, as quality terms, that the corporate color be printed in the same color as a color provided in print data and that a printing result thereof does not vary between pages. In addition, the printing result is often input to the customer as a numerical value indicating a color difference.

A conventional order reception system is unable to receive such a detailed setting related to print quality. The conventional order reception system only holds quality terms determined for each product type, and does not have a structure for reflecting detailed quality terms of a customer in the held quality terms. Thus, when introducing print requirements exchange (PRX), it is necessary to consider how the order reception system receives the detailed quality terms of a customer and converts the detailed quality terms into a format of the PRX.

In a first exemplary embodiment, there is discussed a printing order reception system that creates quality requirement data for satisfying quality terms required by a customer. The printing order reception system calculates necessary quality requirement parameters by analyzing print settings and quality terms set by the customer, so that the quality requirement parameters can be input to a print management workflow together with a job. Accordingly, a printing order reception system of a printing order reception firm, for example, can provide parameters indicating quality terms received from a customer to a system of a printing firm in a standardized predetermined format.

In the present exemplary embodiment, a description will be given of an example of using the above-described PRX as a data format for issuing a print quality requirement. By using such a standard format, it is possible to easily transmit quality terms between a plurality of different customers and printing firms. In addition, it becomes possible to compare the quality terms of different printed products.

FIG. 1 is a block diagram illustrating an overview of a printing system according to the present exemplary embodiment. A role of each apparatus and details of operation of the printing system will be described in detail with reference to FIG. 2 and subsequent diagrams. In FIG. 1, a parallelogram-shaped item indicates data. In the present exemplary embodiment, an order reception system server 110 serving as an information processing apparatus generates PRX data, and transmits the PRX data to a workflow management server 100. The workflow management server 100 analyzes the PRX data received from the order reception system server 110, and transmits print data, a job ticket, operation setting information, and a control instruction that are based on an analysis result to a production system 120. The workflow management server 100 is a control system that controls a printing apparatus to output a printed product satisfying a required print quality.

Figure 2:
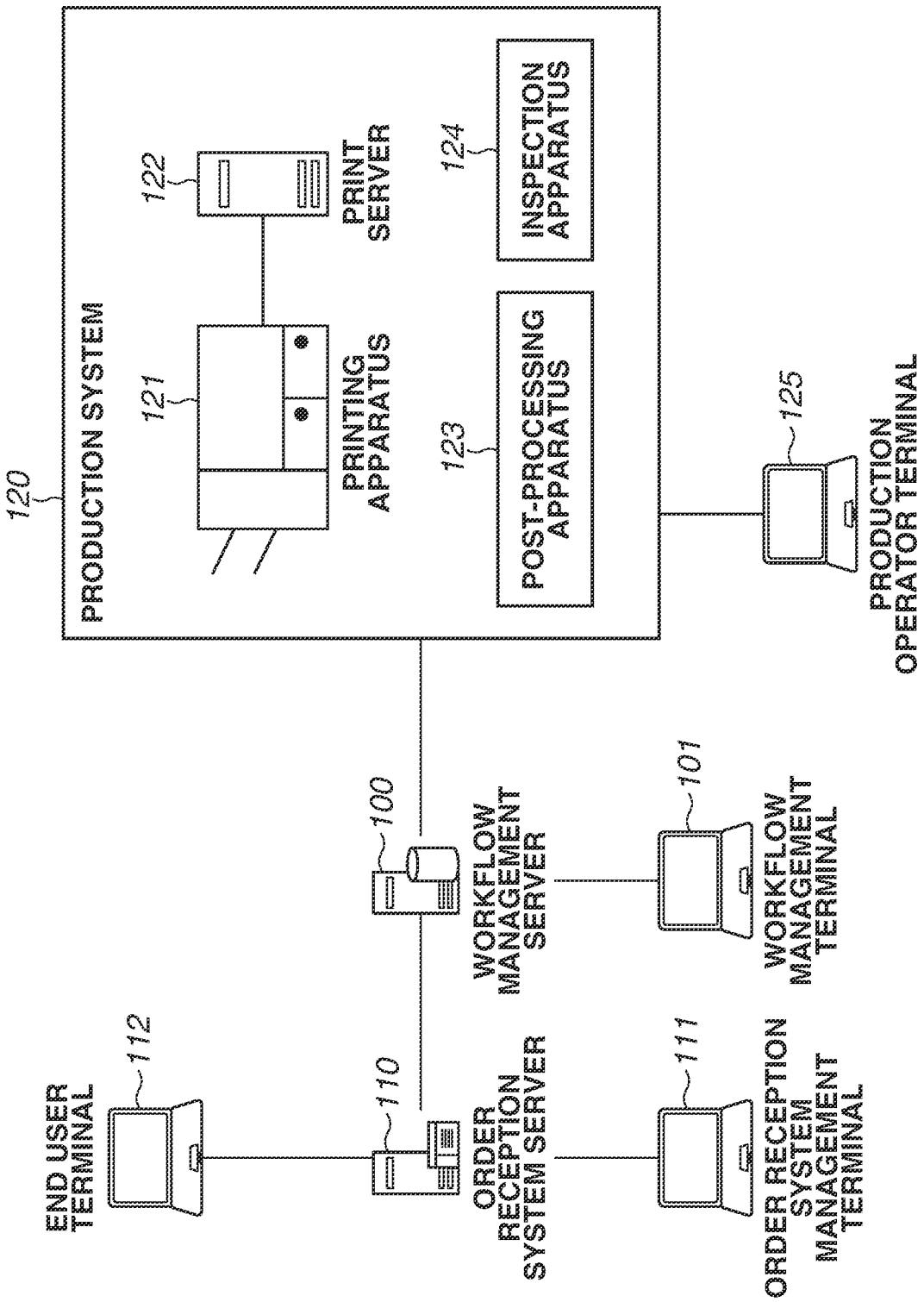
FIG. 2 is a conceptual diagram illustrating an overall configuration of a system according to an exemplary embodiment.

FIG. 2 is a diagram illustrating a configuration of a commercial printing system according to the present exemplary embodiment.

The workflow management server 100 is an apparatus that manages an entire workflow for a commercial printing product.

The workflow management server 100 receives, from the order reception system server 110, print data and PRX data, which is quality terms information. Then, the workflow management server 100 interprets the PRX data received from the order reception system server 110, and determines the production system 120 and executes prepress processing of the print data for each received job.

In addition, the workflow management server 100 generates data to be processed by the production system 120 (e.g., print data, a job ticket, operation setting information, and a control instruction that are illustrated in FIG. 1), and transmits the generated data to apparatuses included in the production system 120. The apparatuses included in the production system 120 will be described below.

Furthermore, based on information acquired from the apparatuses (control result illustrated in FIG. 1), the workflow management server 100 generates print quality exchange (PQX) data, and transmits the PQX data to the order reception system server 110.

In the present exemplary embodiment, the workflow management server 100 is described as an on-premises server installed at a site where workflow management is performed, but the workflow management server 100 is not limited to this. As another exemplary embodiment, the workflow management server 100 may be constructed as a cloud server and may be connected with a workflow management terminal 101, which will be described below, via the Internet. The same applies to the order reception system server 110, which will be described below.

The workflow management terminal 101 is a terminal operated by a workflow manager, and connects to the workflow management server 100 via a network and executes various functions. For example, the workflow management terminal 101 changes a setting of a workflow management function and checks the states of the devices included in the production system 120.

The order reception system server 110 is an apparatus that manages a system for receiving an order for a product of commercial printing from an end user. In accordance with the ordered product or the content of the order received from the end user, the order reception system server 110 generates print data and PRX data, and transmits the print data and the PRX data to the workflow management server 100.

An order reception system management terminal 111 is a terminal operated by an order reception system manager, and connects to the order reception system server 110 via a network and executes various functions. Specific examples of the various functions include a function of setting quality requirement for each product, a function of checking a status of each received job, and a function of browsing quality information of a product for each received job.

An end user terminal 112 is a terminal operated by the end user, and connects to the order reception system server 110 via a network. Then, the end user terminal 112 receives instructions for selecting a product, transmitting document data, and placing an order, from the end user via a user interface (UI) such as a web browser. The end user terminal 112 transmits the instructions to the order reception system server 110.

The production system 120 is a system for producing a product for a commercial printing order that has been received from the end user. More specifically, the production system 120 includes apparatuses such as a printing apparatus 121, a print server 122 that controls the printing apparatus 121, a post-processing apparatus 123, and an inspection apparatus 124.

The printing apparatus 121 and the print server 122 are connected via a network or a dedicated interface.

In the present exemplary embodiment, the post-processing apparatus 123 and the inspection apparatus 124 are each described as having a nearline configuration of being connected with another device via a network. Nevertheless, the configurations of the post-processing apparatus 123 and the inspection apparatus 124 are not limited to this, and the post-processing apparatus 123 and the inspection apparatus 124 may each have an offline configuration of operating independently. In a case where the post-processing apparatus 123 and the inspection apparatus 124 have the offline configurations, the post-processing apparatus 123 and the inspection apparatus 124 each connect with an operation terminal (not illustrated) connectable to a network to connect to the network via the operation terminal. In any case, the post-processing apparatus 123 and the inspection apparatus 124 connect with the workflow management server 100 via a network and transmit and receive various types of information.

The production system 120 has a configuration not including any or all of the print server 122, the post-processing apparatus 123, and the inspection apparatus 124 in some cases.

The printing apparatus 121 is an apparatus that executes print processing based on data and an instruction from the workflow management server 100. A printing method is not particularly limited and can be an electrophotographic method, an ink-jet method, or another method.

A manager or an operator of the production system 120 can issue an instruction for controlling printing via a UI of the printing apparatus 121.

The print server 122 is a server that controls the printing apparatus 121. Similarly to a general printing system, the manager or the operator of the production system 120 can issue the instruction for controlling printing via a UI of the print server 122.

In the present exemplary embodiment, a color management unit 545 to be described below is described as being included in the print server 122, but the configuration is not limited to this. For example, a color management server (not illustrated) connectable with the print server 122 and the printing apparatus 121 via a network may be additionally installed, and the color management server may execute processing related to color management.

The post-processing apparatus 123 is an apparatus for performing post-processing on a printed sheet or sheet bundle. For example, the post-processing refers to creasing or folding of the sheet, cutting of the sheet bundle, and bookbinding processing.

The inspection apparatus 124 is an apparatus that detects a defect in a final product or an intermediate product, and executes processing such as notification to the user and removal from a production line.

A production operator terminal 125 is an apparatus used by an operator who operates the above-described various apparatuses included in the production system 120. The production operator terminal 125 has functions such as a function of checking an operational status of each of the apparatuses, and a function of checking error information generated when an abnormality occurs. As another configuration, a UI operation unit included in each of the apparatuses may have the functions instead of an external terminal.

The production operator terminal 125 is a terminal operated by a production system manager, and connects to the production system 120 via a network, and can monitor the state of the production system 120 and manage the production system 120.

Next, hardware configurations of various apparatuses according to the present exemplary embodiment will be described.

Figure 3:
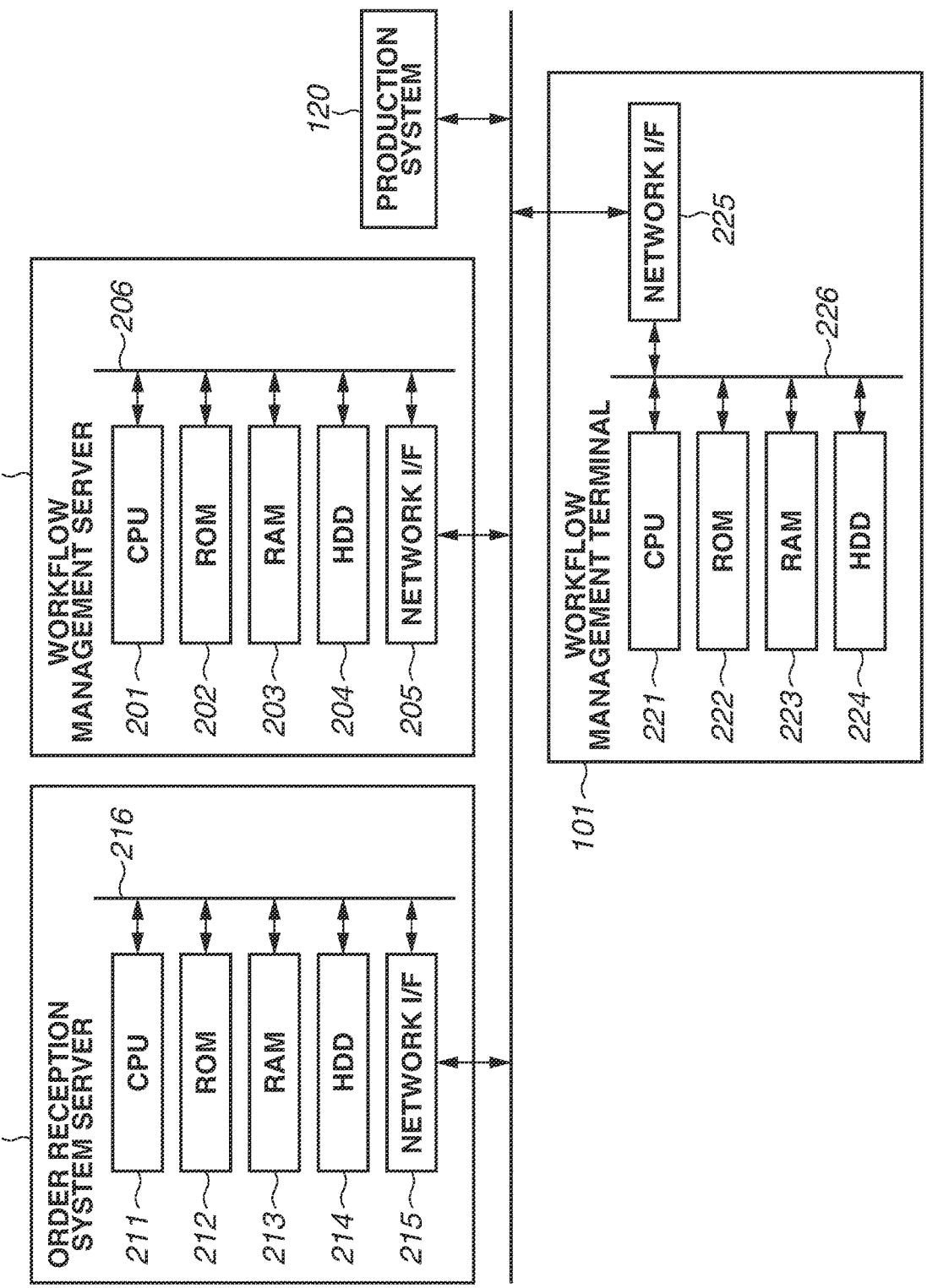
FIG. 3 is a block diagram illustrating a hardware configuration of a workflow management system according to an exemplary embodiment.

FIG. 3 is a block diagram illustrating a hardware configuration of a workflow management system including the workflow management server 100 and the workflow management terminal 101 according to the present exemplary embodiment.

First, a hardware configuration of the workflow management server 100 will be described.

A central processing unit (CPU) 201 comprehensively controls access to and from various devices connected to a system bus 206 by loading a control program stored in a read-only memory (ROM) 202 or a hard disk drive (HDD) 204 into a random access memory (RAM) 203 and executing the loaded program. The ROM 202 stores the control program executable by the CPU 201. The RAM 203 mainly functions as a main memory and a work area of the CPU 201, and can have expanded memory capacity by using an optional RAM 203 connected to an expansion port (not illustrated). The HDD 204 stores a boot program, various applications, font data, a user file, and an edit file. While the HDD 204 is used in the first exemplary embodiment, a secure digital (SD) card or a flash memory may be used as an external storage device instead of the HDD. The same applies to an apparatus including an HDD that will be described below. A network interface (I/F) 205 performs data communication with various apparatuses via a network.

The hardware configuration of the order reception system server 110 is similar to that of the workflow management server 100. Thus, the description thereof will be omitted.

Next, a hardware configuration of the workflow management terminal 101 will be described.

A CPU 221 comprehensively controls access to and from various devices connected to a system bus 226 by loading a control program stored in a ROM 222 or an HDD 224 into a RAM 223 and executing the loaded program. The ROM 222 stores a control program executable by the CPU 221. The RAM 223 mainly functions as a main memory and a work area of the CPU 221, and can have expanded memory capacity by using an optional RAM 223 connected to an expansion port (not illustrated).

The HDD 224 stores a boot program, various applications, font data, a user file, and an edit file. A network I/F 225 performs data communication with another apparatus via a network.

The hardware configurations of the order reception system management terminal 111, the end user terminal 112, and the other terminal apparatus such as the production operator terminal 125 are similar to that of the workflow management terminal 101. Thus, the description thereof will be omitted.

FIG. 4 is a block diagram illustrating a hardware configuration of the production system 120 according to the present exemplary embodiment.

A CPU 301 comprehensively controls access to and from various devices connected to a system bus 306 by loading a control program stored in a ROM 302 or an HDD 304 into a RAM 303 and executing the loaded program. The ROM 302 stores a control program executable by the CPU 301. The RAM 303 mainly functions as a main memory and a work area of the CPU 301, and can have expanded memory capacity by using an optional RAM connected to an expansion port (not illustrated). The HDD 304 stores a boot program, various applications, font data, a user file, and an edit file. A network I/F 305 performs data communication with another apparatus via a network.

A printer I/F 307 controls an image output to an image forming unit 321 of the printing apparatus 121. The printer I/F 307 further controls a measurement unit 322 included in the printing apparatus 121, and receives a measurement result.

The printing apparatus 121 includes at least the image forming unit 321 that performs a printing operation, and the measurement unit 322 to be described below. The printing apparatus 121 can include a sheet feeding device (not illustrated) and an in-line post-processing device (not illustrated) in addition to the above-described units.

The image forming unit 321 outputs print data onto a sheet. The hardware configuration of the image forming unit 321 is identical to that of a general printing apparatus 121.

The measurement unit 322 measures a printed product generated by the image forming unit 321 based on an instruction from the print server 122 or the printing apparatus 121. A measurement method is a known measurement method, such as spectrophotometric colorimetry, density measurement, CCS scan, or CIS scan. In the present exemplary embodiment, the measurement unit 322 is described as being provided in the printing apparatus 121, but the configuration is not limited to this.

The measurement unit 322 may individually connect to a network independently of the printing apparatus 121. Alternatively, the measurement unit 322 can connect with an operation terminal (not illustrated) connectable to a network to connect to the network via the operation terminal. In any case, the measurement unit 322 connects with the workflow management server 100 via a network and transmits and receives various types of information.

Next, software configurations of various apparatuses according to the present exemplary embodiment will be described.

FIG. 5A is a block diagram illustrating a software configuration of the order reception system server 110 according to the present exemplary embodiment. Software modules are stored in the HDD 214 as programs and implemented by the CPU 211 loading the programs into the RAM 213 and executing the programs.

An order reception unit 501 receives order information of a product from the end user terminal 112 via a network. The order information includes information regarding a product type, input image data, and requirement information related to quality. In the present exemplary embodiment, portable document format (PDF) data will be described as an example of input data, but the input data is not limited to this. Image data in another general format interpretable by the production system 120 may be handled.

A PQX control unit 502 receives PQX data from the workflow management server 100 and performs predetermined control. For example, the PQX control unit 502 records the PQX data into a database, and converts the PQX data into information to be presented to the end user.

A PRX generation unit 503 includes an order information analysis unit 5031, a quality requirement generation unit 5032, and a PRX data holding unit 5033, generates PRX data, and transmits the generated PRX data to the workflow management server 100.

The order information analysis unit 5031 analyzes the order information, and determines requirement information and a determination standard that are related to a product type and quality, and quality terms considered to be important.

The quality requirement generation unit 5032 generates PRX data by reflecting quality terms individually designated by the end user based on PRX data prepared for each product type that is held by the PRX data holding unit 5033.

The PRX data holding unit 5033 holds PRX data suitable for a product type and a print setting. For example, the PRX data holding unit 5033 holds PRX data in which an acceptable error of a registration displacement between front and back sides is specified to be 3 mm or less as PRX data for a product type "photo book", and holds PRX data in which an acceptable error of a registration displacement between the front and back sides is specified to be 1 mm or less as PRX data for a product type "name card".

A data management unit 504 records information such as order information, PRX data, and PQX data. In addition, the data management unit 504 transmits input image data, product type information, and PRX data to the workflow management server 100. Furthermore, the data management unit 504 transmits and receives other types of data to and from the various apparatuses.

FIG. 5B is a block diagram illustrating a software configuration of the workflow management server 100 according to the present exemplary embodiment. Software modules are stored in the HDD 204 as programs and implemented by the CPU 201 loading the programs into the RAM 203 and executing the programs.

A PRX analysis unit 521 analyzes PRX data received from the order reception system server 110, and identifies a print quality requirement and part of required prepress processing.

For example, the print quality requirement requires an average color difference obtained from measurement results of predetermined color patch images to fall within a specific standard. An example of the prepress processing is processing of adding the color patch images to be subjected to color measurement in color quality check processing to a margin of image data.

A process management unit 522 determines the production system 120 and issues a command to a prepress control unit 524 by using the product type information received from the order reception system server 110 and analysis result information from the PRX analysis unit 521.

Depending on product types, a product can include a plurality of types of parts. In such a case, the process management unit 522 generates a job for each part from one order.

The process management unit 522 generates job ticket data to be referred to by the apparatuses included in the production system 120. In the present exemplary embodiment, the description will be given using known job definition format (JDF) data as an example of job ticket data, but the job ticket data is not limited to this. Another known job ticket data format interpretable by the production system 120 can be used.

In addition, the process management unit 522 refers to information regarding a print quality requirement, and generates operation setting information of the post-processing apparatus 123 and the inspection apparatus 124.

Furthermore, the process management unit 522 transmits PDF data having been subjected to the prepress processing to be described below, JDF data, and operation setting information of each apparatus to the production system 120.

A PQX generation unit 523 generates PQX data with reference to various types of information received from the production system 120, and transmits the generated PQX data to the order reception system server 110. The details will be described below.

The prepress control unit 524 executes the prepress processing on input image data based on an instruction from the process management unit 522, and transmits the processed PDF data to the process management unit 522.

A data management unit 525 transmits PQX data to the order reception system server 110. The data management unit 525 also transmits, to the production system 120, PDF data, JDF data, and information regarding instructions to various apparatuses included in the production system 120. Furthermore, the data management unit 525 transmits and receives other types of data to and from the various apparatuses.

FIG. 5C is a block diagram illustrating a software configuration of the production system 120 according to the present exemplary embodiment. In the various apparatuses included in the production system 120, software modules are stored in the HDD 304 as programs and implemented by the CPU 301 loading the programs into the RAM 303 and executing the programs. The production system 120 includes the printing apparatus 121, the print server 122, the post-processing apparatus 123, and the inspection apparatus 124. In the present exemplary embodiment, the above-described four hardware components are regarded as the production system 120.

A print control unit 541 executes print control using information (PDF, JDF data) received from the workflow management server 100. The print control unit 541 also has an adjustment function of adjusting print quality, and executes the adjustment function based on a control instruction received from any of the workflow management server 100, the print server 122, and the production operator terminal 125.

The print control unit 541 includes a measurement control unit 5411. The measurement control unit 5411 executes measurement control using the measurement unit 322 based on a control instruction received from any of the workflow management server 100, the print server 122, and the production operator terminal 125.

A post-processing control unit 542 executes post-processing control based on a control instruction received from the workflow management server 100.

An inspection control unit 543 executes inspection control using the inspection apparatus 124 based on a control instruction received from the workflow management server 100.

The inspection control unit 543 compares image data read by a sensor included in the inspection apparatus 124 with reference image data. If a difference exceeding a predetermined acceptable range is detected as a result of comparison, the inspection control unit 543 identifies an inspection target object as a defective product and performs predetermined control such as notification to the user.

A data management unit 544 transmits information, such as control results of the various apparatuses included in the production system 120, to the workflow management server 100. Furthermore, the data management unit 544 transmits and receives other data to and from the various apparatuses. The data management unit 544 may be individually included in each of the apparatuses.

The color management unit 545 manages the color quality of a product output by using the printing apparatus 121 and the print server 122. More specifically, the color management unit 545 controls known color adjustment processing and color quality check processing.

Figure 6:
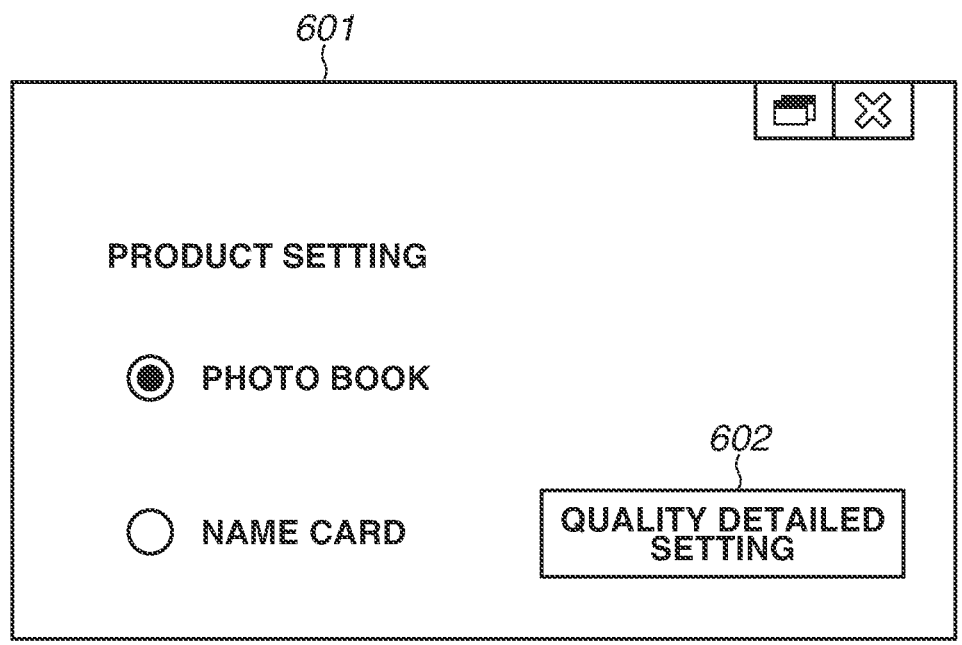
FIG. 6 is a diagram illustrating an example of a user interface (UI) for setting a print type according to an exemplary embodiment.

FIG. 6 is a diagram illustrating an example of a UI displayed on the order reception system server 110 according to the present exemplary embodiment. When placing a printing order, the end user selects the type of a product to be created using a UI 601 illustrated in FIG. 6.

Figure 7A:
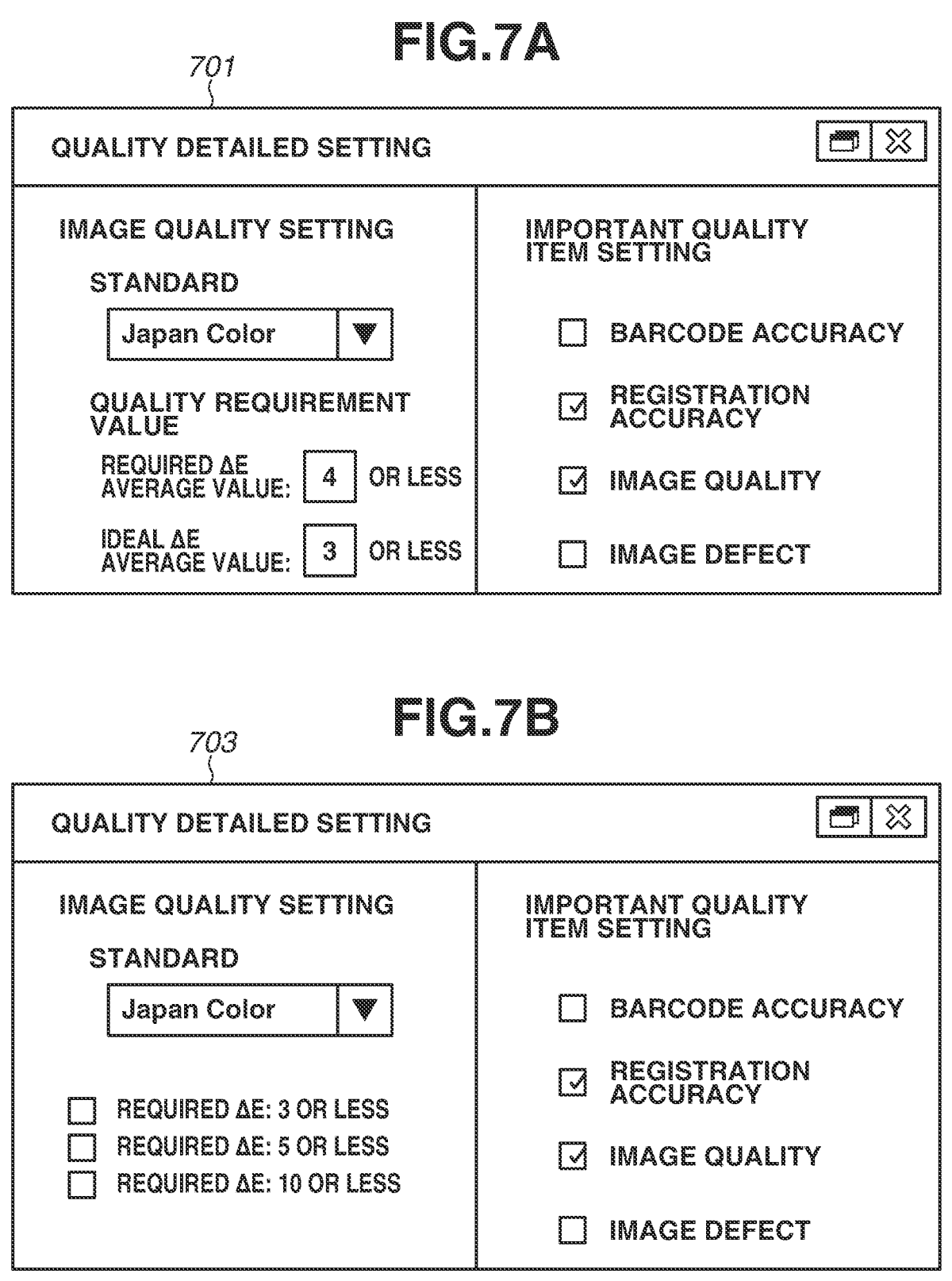

FIG. 7A is a diagram illustrating an example of a UI displayed on the order reception system server 110 according to the present exemplary embodiment. The UI is displayed on the order reception system server 110 by the end user pressing a quality detailed setting button 602 provided on the UI 601 illustrated in FIG. 6.

The end user can perform the detailed setting of quality terms for the quality of a printed product using a UI 703. For example, the end user can input a quality standard required for each job based on the standard of Japan Color. Thus, the end user can designate specific numerical values of an acceptable value and an ideal value of an average value of a color difference $\Delta E00$ (CIE DE2000) between a colorimetric value of a produced printed product and a Japan Color specified value. As another example, the end user can specify a quality term of importance among a plurality of quality terms. Accordingly, the end user can set a quality term of particular importance to each print job.

As a method of designating a color difference between a standard color value such as a Japan Color specified value and a colorimetric value of a printed product, as illustrated in FIG. 7B, the user may be allowed to select any option from among a plurality of options for different quality levels. In the example illustrated in FIG. 7B, the level of the average value of the color difference $\Delta E00$ (CIE DE2000) from the Japan Color specified value can be selected from among 3 or less, 5 or less, and 10 or less.

Figure 8:
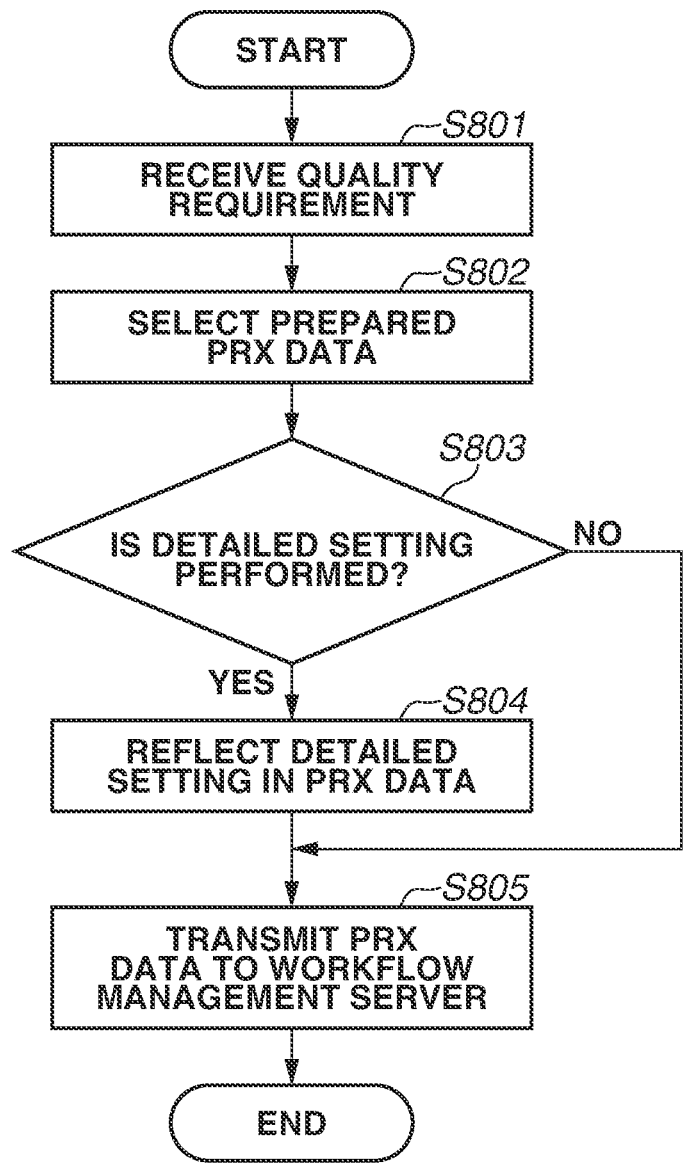
FIG. 8 is a flowchart illustrating software processing according to an exemplary embodiment.

FIG. 8 is a flowchart illustrating software processing according to the present exemplary embodiment.

A control program of the flowchart illustrated in FIG. 8 is stored in a ROM 212 included in the order reception system server 110, loaded into a RAM 213 by a CPU 211, and executed by the CPU 211.

In step S801, the order reception unit 501 receives an order from the end user. The order includes PDF data serving as print data and a product type of a product. The product type is information indicating a type of a product that is predefined by the order reception system server 110. For example, the order reception system server 110 can define two product types, i.e., "Photo Book" and "Name Card". The product type "Photo Book" indicates the type of a product for which a finished sheet size is set to A5 size, a bookbinding type is set to Perfect Binding, a sheet type of a body portion is set to "Glossy Paper", and finishing of the body portion is set to "Lamination". The product type "Name Card" indicates the type of a product for which a finished sheet size is set to "Name Card", a bookbinding type is set to "No Bookbinding", and a sheet type is set to "Quality Paper". Such product types are provided so that the type of a product to be produced using the order reception system server 110, the workflow management server 100, and the production system 120 can be defined. In the present exemplary embodiment, a case is described where the end user selects the product type "Photo Book". In the present exemplary embodiment, a configuration where the order reception system server 110 defines the product types is described, but the configuration is not limited to this. A configuration where a sales representative manually inputs an order from the end user may also be used.

The order reception unit 501 transmits, to the PRX generation unit 503, a product type of the product ordered from the end user via the UI 601. If the end user selects the product type "Photo Book" from among the product types, the order reception unit 501 transmits information indicating that the selection by the end user is the product type "Photo Book" to the PRX generation unit 503.

The PRX generation unit 503 generates PRX data based on the product type selected via the UI 601 and received from the order reception unit 501.

First, an overview of the PRX data to be generated in the processing will be described. As exemplified in FIG. 9, the PRX data includes requirements regarding quality such as MessageInfo, BusinessInfo, and QualitySpec.

The QualitySpec includes fields regarding quality specifications and an evaluation standard. BasisOfCalculation represents information regarding a calculating formula for deriving a score or a grade of print quality that is designated by a buyer. OverallGradingScale represents an overall score and a meaning and a range of the grade. MinimumAcceptableRank represents a lowest acceptable quality level. QualityParameterSet represents a score standard of each of color, registration, image defect, and barcode. QualityParameterSetType represents the type of a quality specification of color, registration, image defect, or barcode. QualityParameterSetName represents the name of a quality specification. ParameterSetScoringScale represents the definition of a score standard defined by a buyer. In the present exemplary embodiment, the information is described in a part of QualitySpec, but the configuration is not limited to this. Another field of the PRX may be used.

As a first example of QualityParameterSet, a color fluctuation inspection is performed by the print control unit 541. The print control unit 541 includes the measurement control unit 5411, and can monitor a color fluctuation of the production system 120 while producing a product. An example of printed color standard is Japan Color. The production system 120 satisfying the standard is verified that the quality of a printed product is a certain level or more.

In the present exemplary embodiment, the print control unit 541 performs the color fluctuation inspection by checking whether each job satisfies the Japan Color standard. The print control unit 541 inspects a printed product for a color fluctuation using an average value of the color difference $\Delta E00$ (CIE DE2000) between the Japan Color specified value and a colorimetric value of the printed product produced by the production system 120. In this case, "Color Fluctuation Inspection" is set in the QualityParameterSetName, and "Color" is set in the QualityParameterSetType. In addition, the following terms are described in the ParameterSetScoringScale: "RankColor1" in DisplayLabel, "1" in Rank, and "Average $\Delta E$ is 4 or More" in ValueRange; "RankColor2" in DisplayLabel, "2" in Rank, and "Average $\Delta E$ is Less Than 4 and 3 or More" in ValueRange; and "RankColor3" in DisplayLabel, "3" in Rank, and "Average $\Delta E$ is Less Than 3" in ValueRange. The higher the numerical value of a rank is, the higher the quality is. In addition, by setting "2" in Rank in the MinimumAcceptableRank in the QualityParameterSet, the minimum quality level can be described. As a second example of QualityParameterSet, an appearance inspection of toner scattering is performed by an inspection apparatus. Before the production is started by the production system 120, a correct image is acquired with a camera included in the inspection apparatus, and the correct image is registered in the inspection apparatus. During the production, the inspection apparatus inspects toner scattering by acquiring an image of a printed result using the camera and comparing the image of the printed result with the correct image. In this case, "Scattering Inspection" is set in the QualityParameterSetName. Then, "Defects" is set in the QualityParameterSetType. In addition, the following terms are described in the ParameterSetScoringScale: "RankDefects1" in DisplayLabel, "1" in Rank, and "Scattering Diameter is 3 mm or More" in ValueRange; "RankDefects2" in DisplayLabel, "2" in Rank, and "Scattering Diameter is Less Than 3 mm and 2 mm or More" in ValueRange; and "RankDefects3" in DisplayLabel, "3" in Rank, and "Scattering Diameter is Less Than 2 mm" in ValueRange. The higher the numerical value of a rank is, the higher the quality is. In addition, by setting "2" in Rank in the MinimumAcceptableRank in the QualityParameterSet, the minimum quality level can be described. Using QualityParameterSet as described above, the rank of quality is calculated by the BasisOfCalculation. For example, a calculating formula for total quality that is based on the Ranks of the color fluctuation inspection and the scattering inspection is described in the BasisOfCalculation. For example, a calculating formula such as TotalRank=Rank(Color Fluctuation Inspection)*0.6+Rank(Scattering Inspection)*0.3 is described. TotalRank represents the total quality, and Rank (QualityParameterSetName) represents a Rank corresponding to QualityParameterSetName. The meaning of the rank of the quality that has been calculated using the above-described BasisOfCalculation is represented by the OverallGradingScale. The meanings of the ranks of the quality are described as the following: "Poor" in DisplayLabel, "1" in Rank, "Good" in DisplayLabel, "2" in Rank, "Excellent" in DisplayLabel, and "3" in Rank. The PRX data holding unit 5033 included in the PRX generation unit 503 holds the PRX data representing the above-described quality standards as fixed reference values.

In step S802, the PRX generation unit 503 acquires PRX data suitable for the ordered printed product among PRX data held by the PRX data holding unit 5033. For example, if the product type "Photo Book" is selected via the UI 601, the PRX generation unit 503 acquires PRX data for photo book from the PRX data holding unit 5033.

In step S803, the PRX generation unit 503 determines whether the end user has performed the detailed setting of quality terms for the ordered printed product. For example, if the user sets, as an average value of the color difference $\Delta E00$ from the Japan Color specified value, a required $\Delta E00$ average value to 3 or less and an ideal $\Delta E00$ average value to 2 or less using the UI 701, it is determined that a detailed printing condition setting is performed. If it is determined that the detailed printing condition setting is performed (YES in step S803), the processing proceeds to step S804. If it is determined that the detailed printing condition setting is not performed (NO in step S803), the processing proceeds to step S805. In step S805, the PRX data acquired in step S802 is transmitted to the workflow management server 100.

In step S804, the quality requirement generation unit 5032 reflects the detailed setting of quality terms in the PRX data acquired in step S802. In the present exemplary embodiment, the description will be given of an example case in which the user sets, as an average value of the color difference ΔE00 from the Japan Color specified value, a required ΔE00 average value to less than 3 and an ideal ΔE00 average value to less than 2 using the UI 701. The quality requirement generation unit 5032 performs editing processing on the quality terms in which the following terms are set: "Color Fluctuation Inspection" in QualityParameterSetName, and "Color" in QualityParameterSetType of the PRX data acquired in step S802.

As illustrated in PRX data for photo book 1001 in FIG. 10A, standard quality requirements for a photo book are preset in QualityParameterSet. The following terms are set in the ParameterSetScoringScale: "RankColor1" in DisplayLabel, "1" in Rank, "ΔE00 Average Value is 4 or More" in ValueRange, "RankColor2" in DisplayLabel, "2" in Rank, "E00 Average Value is Less Than 4 and 3 or More" in ValueRange, "RankColor3" in DisplayLabel, "3" in Rank, "ΔE00 Average Value is Less Than 3" in ValueRange, and "2" in Rank set in MinimumAcceptableRank.

The parameters in the PRX data are changed as illustrated in edited PRX data 1002 in FIG. 10. More specifically, the parameters are changed as follows: "RankColor1" in DisplayLabel, "1" in Rank, "ΔE00 Average Value is 3 or More" in ValueRange, "RankColor2" in DisplayLabel, "2" in Rank, "ΔE00 Average Value is Less Than 3 and 2 or More" in ValueRange, "RankColor3" in DisplayLabel, "3" in Rank, "ΔE00 Average Value is Less Than 2" in ValueRange, "2" in Rank set in MinimumAcceptableRank of the QualityParameterSet, and "3" in Rank set in DesiredRank.

The DesiredRank in the PRX can represent a quality standard expected by the user. By using the DesiredRank, it becomes possible to notify the workflow management server 100 of an ideal quality standard expected by the end user together with the minimum quality standard. Accordingly, it becomes possible for a printing firm to achieve higher customer satisfaction measurement.

As another example, the description will also be given of a case where the user sets an important quality term using the UI 701. As stated in the above description of the PRX data, the rank of quality of a printed product that is based on a plurality of quality terms can be calculated using the BasisOfCalculation. For example, a calculating formula for total quality that is based on the ranks of the color fluctuation inspection and the scattering inspection is described in the BasisOfCalculation. For example, as illustrated in PRX data for photo book 1101 in FIG. 11, a calculating formula like "TotalRank=Rank(color fluctuation inspection)*0.6+Rank (scattering inspection)*0.3" is described in the PRX data as a standard quality setting for a photo book. If the user sets image defect as the important quality term in this case using the UI 701, the value of a weighting of the scattering inspection in the calculating formula included in the BasisOfCalculation is changed to a smaller value. In the present exemplary embodiment, setting image defect as the important quality term means lowering an acceptable level of image defect. For example, setting image defect as the important quality term means tightening a standard of the toner scattering inspection as the image defect. For example, as illustrated in edited PRX data 1102 in FIG. 11, the calculating formula is changed to "TotalRank=Rank(Color Fluctuation Inspection)*0.6+Rank(Scattering Inspection) *0.1". To heighten the rank set in the OverallGradingScale by changing the calculating formula in this manner, an inspection result of the scattering inspection desirably indicates quality higher than the standard quality standard in such a manner as to satisfy a quality requirement as the entire printed product. Thus, it becomes possible to conduct an inspection using a stricter standard for the setting of an important quality term of the end user. In step S805, the PRX generation unit 503 transmits the PRX data edited in step S804 to the workflow management server 100.

In the present exemplary embodiment, the description has been given of the detailed setting of a color difference from Japan Color being a standard color. Alternatively, detailed settings regarding an image positional shift caused by elution of a sheet, readability of a barcode, or an image defect may be received and reflected. In addition, the structure of the PRX data illustrated in FIGS. 10A, 10B, 11A, and 11B is not limited to an extensible markup language (XML) format. In addition, a description method of a parameter describing each of the quality terms and a description method of a calculating formula may use another format such as a method that uses a mathematical formula.

In the present exemplary embodiment, the CPU 211 of the order reception system server 110 performs display control to display, on a display unit, a user interface for prompting the user to select a print quality setting of print data from among predetermined options. For example, as illustrated in FIG. 7A, a user interface for prompting the user to select an item to be prioritized, from among a plurality of items related to print quality, is displayed on the display unit. The plurality of items related to print quality includes barcode accuracy, registration accuracy, image quality, and the level of an acceptable image defect. From among these items, the user selects an item to be prioritized.

In the present exemplary embodiment, only by the user selecting an item from options, quality requirement data is automatically generated. For example, by setting a weighting of the item selected by the user as an item to be prioritized to a value larger than values of weightings of other items, a total value (e.g., TotalRank in FIG. 11) indicating a total print quality of a printed product is generated. In particular, the quality requirement data is generated in conformity to a format such as PRX that can be used in a plurality of printing control systems. Accordingly, the user does not have to generate a quality requirement compliant with a predetermined format, and a printing request convenient for the user can be received.

Moreover, in the present exemplary embodiment, by providing an order reception system with a setting unit of a detailed quality requirement aside from a setting unit of a normal print setting, it becomes possible to receive the detailed quality requirement from the end user even in a printing order reception environment in which a quality standard fixed for each order type is used.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2019-088595, filed May 8, 2019, which is hereby incorporated by reference herein in its entirety.

What is claimed is:

1. An information processing apparatus comprising:
a user interface that sets at least an acceptable range of a color difference between a standard color value and a color value to be obtained by reading a printed product to be output by performing printing based on print data, and an ideal range of the color difference between the standard color value and the color value;
a controller that generates quality requirement data based on at least the acceptable range and the ideal range which are set by the user interface; and
a communicator that transmits the print data and the quality requirement data generated by the controller.

2. The information processing apparatus according to claim 1, wherein the user interface further sets at least any of barcode accuracy, registration accuracy, image quality, or a level of an acceptable image defect, and
wherein the quality requirement data further includes information regarding at least any of the barcode accuracy, the registration accuracy, the image quality, or the level of the acceptable image defect.

3. The information processing apparatus according to claim 1,
wherein the controller generates a total value indicating total print quality of the printed product based on a level of quality required for each of a plurality of items related to print quality, and
wherein the communicator transmits the quality requirement data including the total value generated by the controller.

4. The information processing apparatus according to claim 1, wherein the user interface further sets the standard color value.

5. The information processing apparatus according to claim 1,
wherein the communicator transmits the print data and the quality requirement data to a print control system that controls a printing apparatus to output the printed product.

6. The information processing apparatus according to claim 1, wherein the quality requirement data is PRX data.

7. The information processing apparatus according to claim 6, wherein the controller generates the PRX data in which the acceptable range is written as a Minimum Acceptable Rank and the ideal range is written as a Desired Rank.

8. A control method of an information processing apparatus the control method comprising:
setting, by a user interface, at least an acceptable range of a color difference between a standard color value and a color value to be obtained by reading a printed product to be output by performing printing based on print data, and an ideal range of the color difference between the standard color value and the color value;
generating quality requirement data based on at least the acceptable range and the ideals range which are set by the user interface; and
transmitting the print data and the generated quality requirement data.

9. The control method according to claim 8, further comprising setting, by the user interface, at least any of barcode accuracy, registration accuracy, image quality, or a level of an acceptable image defect, and
wherein the quality requirement data further includes information regarding at least any of the barcode accuracy, the registration accuracy, the image quality, or the level of the acceptable image defect.

10. The control method according to claim 8,
wherein a total value indicating total print quality of the printed product is generated based on a level of quality required for each of a plurality of items related to print quality, and
wherein the quality requirement data including the total value generated is transmitted.

11. The control method according to claim 8, wherein the user interface further sets the standard color value.

12. The control method according to claim 8, further comprising transmitting the print data and the quality requirement data to a print control system that controls a printing apparatus to output the printed product.

13. The control method according to claim 8, wherein the quality requirement data is PRX data.

14. The control method according to claim 13, wherein the PRX data in which the acceptable range is written as a Minimum Acceptable Rank and the ideal range is written as a Desired Rank is generated.

15. A non-transitory computer-readable storage medium that stores a program for causing an information processing apparatus to execute a control method comprising:
setting, by a user interface, at least an acceptable range of a color difference between a standard color value and a color value to be obtained by reading a printed product to be output by performing printing based on print data, and an ideal range of the color difference between the standard color value and the color value;
generating quality requirement data based on at least the acceptable range and the ideal range which are set by the user interface; and transmitting the print data and the generated quality requirement data.

* * * * *